United States Patent
Bodin et al.

(10) Patent No.: US 8,032,430 B2
(45) Date of Patent: Oct. 4, 2011

(54) METHOD AND APPARATUS FOR MAPPING CONTENT DESCRIPTIONS TO REUSABLE CONTAINERS

(75) Inventors: William Kress Bodin, Austin, TX (US); Michael Lee Masterson, Cedar Park, TX (US); Stephen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 11/467,203

(22) Filed: Aug. 25, 2006

(65) Prior Publication Data

US 2008/0052202 A1    Feb. 28, 2008

(51) Int. Cl.
*G06F 17/50* (2006.01)
*G08B 13/14* (2006.01)

(52) U.S. Cl. ...................... 705/28; 340/571.2
(58) Field of Classification Search .............. 705/28; 340/571.2
See application file for complete search history.

(56) References Cited

U.S. PATENT DOCUMENTS

| | | | |
|---|---|---|---|
| 4,093,032 A | 6/1978 | Uyama et al. | |
| 4,563,739 A | 1/1986 | Gerpheide et al. | |
| 4,627,504 A | 12/1986 | Moran | |
| 4,964,053 A | 10/1990 | Humble | |
| 5,014,798 A | 5/1991 | Glynn | |
| 5,335,509 A * | 8/1994 | Namisniak et al. | 62/125 |
| 5,418,334 A | 5/1995 | Williams | |
| 5,487,276 A * | 1/1996 | Namisniak et al. | 62/125 |
| 5,711,160 A * | 1/1998 | Namisniak et al. | 62/125 |
| 5,726,880 A | 3/1998 | Bailey et al. | |
| 5,920,261 A * | 7/1999 | Hughes et al. | 340/568.8 |
| 6,032,128 A | 2/2000 | Morrison et al. | |
| 6,089,498 A | 7/2000 | Sticht | |
| 6,101,826 A * | 8/2000 | Bessler | 62/187 |
| 6,158,381 A | 12/2000 | Bray | |
| 6,204,763 B1 | 3/2001 | Sone | |
| 6,327,576 B1 * | 12/2001 | Ogasawara | 705/22 |
| 6,393,848 B2 * | 5/2002 | Roh et al. | 62/126 |
| 6,453,687 B2 * | 9/2002 | Sharood et al. | 62/127 |
| 6,481,602 B1 | 11/2002 | Fritze et al. | |
| 6,519,963 B2 * | 2/2003 | Maeda | 62/259.2 |
| 6,552,663 B2 | 4/2003 | Swartzel et al. | |

(Continued)

FOREIGN PATENT DOCUMENTS

WO    2005015510 A1    2/2005

OTHER PUBLICATIONS

Scher, "RFID Shelf Antennas Featuring Dynasys de-Q Tuning", pp. 1-7, retrieved May 30, 2006 http://rfidusa.com/superstore/product_info.php?cPath=21_39_60&products_id=223.

(Continued)

*Primary Examiner* — Elaine Gort
*Assistant Examiner* — Ashford S. Hayles
(74) *Attorney, Agent, or Firm* — Yee & Associates, P.C.; Mark C. Vallone

(57) ABSTRACT

A method, apparatus, and computer usable program product for mapping a content description to a container. The process identifies a container placed in a storage unit to form an identified container. The identified container includes an unidentified content. The process displays a set of predictive content descriptions for the unidentified content. In response to receiving a selection of a content description from the set of predictive content descriptions, the process maps the selected content description to the unidentified container.

15 Claims, 7 Drawing Sheets

U.S. PATENT DOCUMENTS

| | | | |
|---|---|---|---|
| 6,693,539 B2* | 2/2004 | Bowers et al. | 340/572.1 |
| 6,741,236 B2* | 5/2004 | Yun | 345/173 |
| 6,758,397 B2* | 7/2004 | Catan | 235/385 |
| 6,859,745 B2* | 2/2005 | Carr et al. | 702/81 |
| 6,892,545 B2* | 5/2005 | Ishikawa et al. | 62/126 |
| 6,919,795 B2* | 7/2005 | Roseen | 340/309.16 |
| 6,975,910 B1* | 12/2005 | Brown et al. | 700/90 |
| 6,982,640 B2 | 1/2006 | Lindsay et al. | |
| 7,009,519 B2 | 3/2006 | Leonard et al. | |
| 7,017,359 B2* | 3/2006 | Kim et al. | 62/127 |
| 7,027,958 B2* | 4/2006 | Singh et al. | 702/188 |
| 7,040,455 B2 | 5/2006 | Bogat | |
| 7,044,370 B2 | 5/2006 | Bellis, Jr. et al. | |
| 7,053,773 B2 | 5/2006 | McGarry et al. | |
| 7,065,501 B1* | 6/2006 | Brown et al. | 705/28 |
| 7,096,221 B2* | 8/2006 | Nakano | 707/10 |
| 7,340,414 B2* | 3/2008 | Roh et al. | 705/23 |
| 7,378,968 B2 | 5/2008 | Wang et al. | |
| 7,382,267 B2 | 6/2008 | Brendley et al. | |
| 2002/0003531 A1* | 1/2002 | Kim et al. | 345/173 |
| 2002/0026325 A1* | 2/2002 | Hirahara et al. | 705/1 |
| 2002/0066279 A1* | 6/2002 | Kiyomatsu | 62/125 |
| 2002/0139848 A1* | 10/2002 | Catan | 235/385 |
| 2002/0143624 A1* | 10/2002 | Catan | 705/14 |
| 2002/0157411 A1* | 10/2002 | Ishikawa et al. | 62/231 |
| 2002/0178066 A1* | 11/2002 | Roh et al. | 705/22 |
| 2003/0014323 A1* | 1/2003 | Scheer | 705/26 |
| 2003/0015585 A1 | 1/2003 | Wike, Jr. et al. | |
| 2003/0061129 A1 | 3/2003 | Todd et al. | |
| 2004/0009465 A1* | 1/2004 | Luckanatinvong | 435/4 |
| 2004/0031274 A1* | 2/2004 | Cho et al. | 62/126 |
| 2004/0035123 A1* | 2/2004 | Kim et al. | 62/127 |
| 2004/0100380 A1* | 5/2004 | Lindsay et al. | 340/540 |
| 2004/0253733 A1* | 12/2004 | Prusik et al. | 436/2 |
| 2004/0254759 A1* | 12/2004 | Kubach et al. | 702/174 |
| 2005/0008539 A1* | 1/2005 | Matsuura et al. | 422/68.1 |
| 2005/0082376 A1 | 4/2005 | Lubow et al. | |
| 2005/0086108 A1* | 4/2005 | Sakamoto et al. | 705/14 |
| 2005/0132725 A1* | 6/2005 | Menten et al. | 62/126 |
| 2005/0155372 A1* | 7/2005 | Dentella et al. | 62/441 |
| 2005/0171854 A1* | 8/2005 | Lyon | 705/24 |
| 2005/0258961 A1* | 11/2005 | Kimball et al. | 340/572.1 |
| 2006/0006999 A1* | 1/2006 | Walczyk et al. | 340/539.27 |
| 2006/0055530 A1* | 3/2006 | Wang et al. | 340/539.13 |
| 2006/0119484 A1* | 6/2006 | Chishima et al. | 340/612 |
| 2006/0171570 A1 | 8/2006 | Brendley et al. | |
| 2006/0178947 A1* | 8/2006 | Zsigmond et al. | 705/26 |
| 2006/0190363 A1* | 8/2006 | Brown et al. | 705/28 |
| 2006/0199155 A1* | 9/2006 | Mosher | 434/127 |
| 2006/0210115 A1* | 9/2006 | Nemet | 382/104 |
| 2006/0237427 A1* | 10/2006 | Logan | 219/401 |
| 2007/0016852 A1* | 1/2007 | Kim et al. | 715/513 |
| 2007/0035380 A1 | 2/2007 | Overhultz et al. | |
| 2007/0046552 A1* | 3/2007 | Marino | 343/720 |
| 2007/0103304 A1* | 5/2007 | Newton et al. | 340/572.1 |
| 2007/0251521 A1* | 11/2007 | Schackmuth et al. | 126/369 |
| 2008/0094214 A1* | 4/2008 | Azevedo et al. | 340/568.1 |

OTHER PUBLICATIONS

Lindsay et al., "Retial RFID Systems Without Smart Shelves", 2003, pp. 1-13, retrieved May 30, 2006 http://www.jefflindsay.com/rfid1.shtml.

Gilbert, "Major retailers to test smart shelves", ZDNet News: Jan. 8, 2003, pp. 1-6, retrieved May 31, 2006 http://news.zdnet.com/2100-9584_22-979710.html.

"itag", iTAG RFID—Smart Shelf, AC/Corporation, pp. 1-2, 2003-2006, retrieved May 12, 2006, http://www.ac-corporation.com.ph/products/iTAG/solutions/shelves.asp.

"Automated Livestock management with RFID-Driven Production Systems—15 Years of Work Applying RFID Technology to the Real World", Osborne Industries Inc., 2005, pp. 1-26.

U.S. Appl. No. 11/467,187, filed Aug. 25, 2006, Bodin et al.
U.S. Appl. No. 11/467,190, filed Aug. 25, 2006, Bodin et al.
U.S. Appl. No. 11/467,200, filed Aug. 25, 2006, Bodin et al.
U.S. Appl. No. 11/467,195, filed Aug. 25, 2006, Bodin et al.
U.S. Appl. No. 11/467,214, filed Aug. 25, 2006, Bodin et al.
U.S. Appl. No. 11/467,224, filed Aug. 25, 2006, Bodin et al.
USPTO Office action for related U.S. Appl. No. 11/467,214 dated Sep. 2, 2009.
USPTO Final Office Action for U.S. Appl. No. 11/467,214 dated Mar. 18, 2010.
USPTO Office Action for U.S. Appl. No. 11/467,190 dated Apr. 19, 2010.
USPTO Notice of Allowance for U.S. Appl. No. 11/467,195 dated Jul. 23, 2010.
USPTO Office Action for U.S. Appl. No. 11/467,214 dated Jul. 21, 2010.
USPTO final office action for U.S. Appl. No. 11/467,190 dated Aug. 12, 2010.
USPTO Notice of Allowance for U.S. Appl. No. 11/467,187 dated Oct. 21, 2009.

* cited by examiner

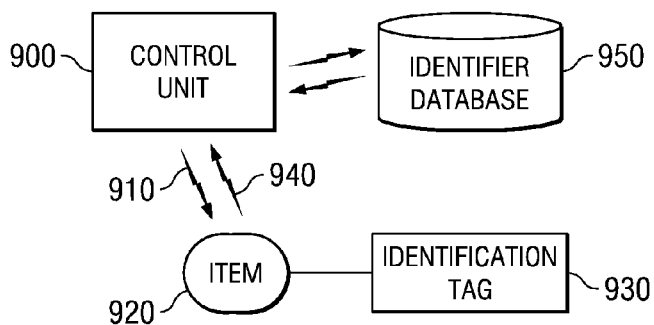
FIG. 9
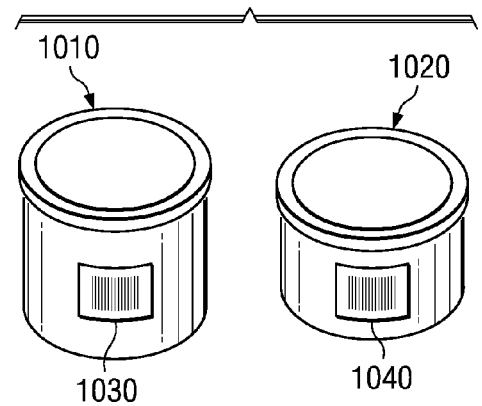
FIG. 10
FIG. 12
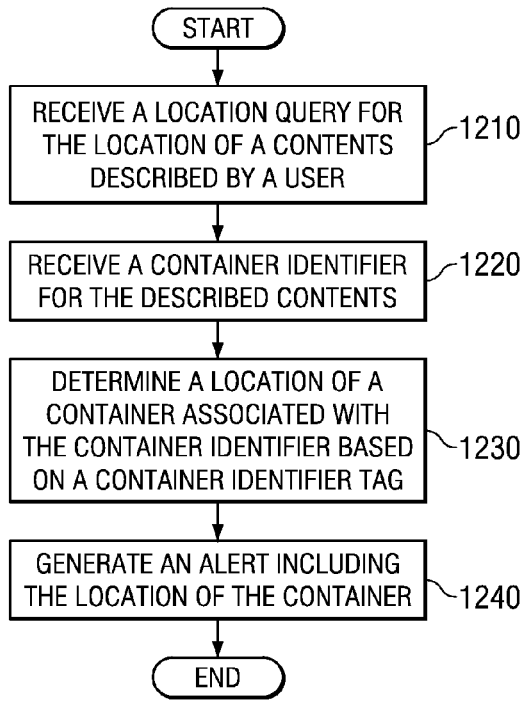

METHOD AND APPARATUS FOR MAPPING CONTENT DESCRIPTIONS TO REUSABLE CONTAINERS

BACKGROUND

1. Field of the Invention

The present application relates generally to an improved data processing system, and in particular to a method and apparatus for identifying contents of containers. Still more particularly, the present invention is directed to a computer implemented method, an apparatus, and computer program product for mapping a predictive content description to a container having unidentified contents.

2. Description of the Related Art

Reusable containers are frequently used to store meal leftover comestibles and other items that can no longer be stored in their original packaging. As used herein, a reusable container is any type of container for storing transient contents. An example of reusable containers includes Tupperware® containers. Many users store various transient contents in multiple identical or similar reusable containers in their refrigerators. Reusable containers can become lost or forgotten in overfilled refrigerators where the reusable container can become hidden or obscured by the other items in the refrigerator.

When a user wishes to locate a particular item stored in a reusable container, such as the leftover Thai Curry, the user must remember which reusable container the desired contents were stored in and where that container is located in the refrigerator. Otherwise, a user must manually search the refrigerator for the reusable container until the user finds the correct container. This search may involve requiring the user to manually open multiple reusable containers until the desired contents of the correct reusable container are located and identified. Moreover, once placed in a refrigerator, the contents of the reusable container may be forgotten until the contents have spoiled.

A universal product code can be utilized to identify items in an inventory. A Universal Product Code bar code is a series of bars and numbers that provide information regarding a product manufacturer and product identification. However, a universal product code only identifies fixed contents of the original product. The Universal Product Code cannot provide information regarding transient contents of a reusable container. Moreover, a Universal Product Code can only be used to locate an item that is being scanned by a Universal Product Code scanner. Once a product is no longer being scanned, a location of the product in inventory can not be determined.

Radio frequency identification (RFID) permit users to identify, track, and locate items in an inventory. Radio frequency identification utilizes a radio frequency identification reader to transmit an interrogate signal to radio frequency identification tags associated with one or more items. These items are referred to as self-describing items. The identification tags send a radio frequency response signal back to the reader that can be used to identify and locate the self-describing items. However, if an item is not a self-describing item associated with an identification tag, the system cannot recognize and locate the item.

Therefore, unless a container is a self-describing item with fixed contents, such as a gallon of milk with a bundled radio frequency identification passive tag or Universal Product Code, the contents of the container cannot be automatically identified. Radio frequency identification tags can be associated with reusable containers. However, the radio frequency identification system would only be able to identify and locate a given reusable container. The system would not be able to identify and locate the particular leftovers, such as the leftover Thai Curry, which is stored in one of the reusable containers. Thus, current systems enable a user to track the location of reusable containers, but these systems do not track the transient contents of these containers.

SUMMARY

The aspects of the illustrative embodiments provide a computer implemented method, apparatus, and computer usable program product for mapping a content description to a container. The process identifies a reusable container placed in a storage unit to form an identified container. The identified container includes an unidentified content. The process displays a set of predictive content descriptions for the unidentified content. In response to receiving a selection of a content description from the set of predictive content descriptions, the process maps the selected content description to the unidentified container.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

FIG. 9 is a block diagram illustrating an interaction of a user interface and tag reader with an identification tag in accordance with an illustrative embodiment;

FIG. 10 is a block diagram illustrating a container having unidentified contents in accordance with an illustrative embodiment;

FIG. 12 is a flowchart illustrating a process for providing a location of a container mapped to a given content description in accordance with an illustrative embodiment.

DETAILED DESCRIPTION OF THE PREFERRED EMBODIMENT

Figure 1:
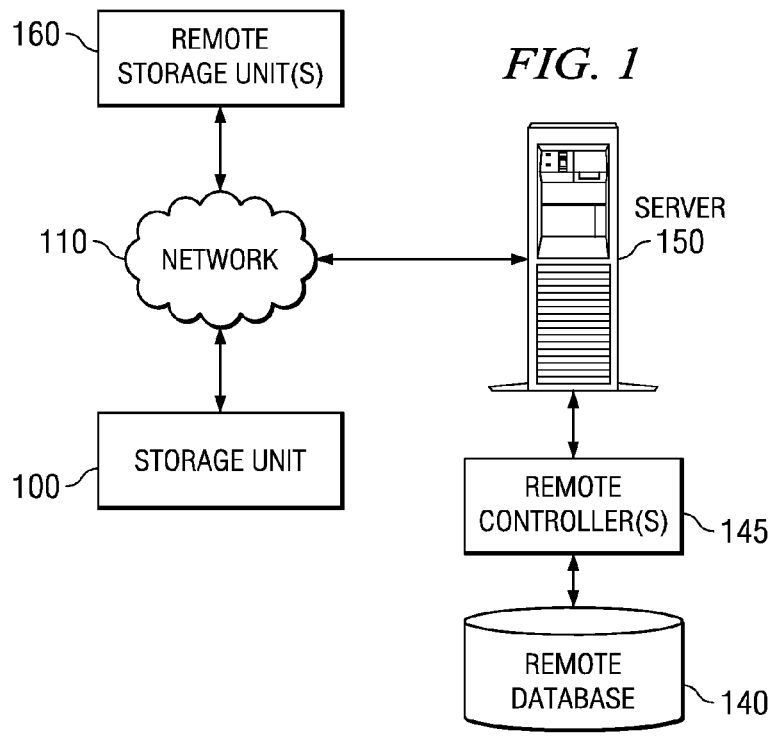
FIG. 1 is a pictorial representation of a network of storage units in accordance with an illustrative embodiment.

Users frequently store leftovers and other items in reusable containers. When a user wants to locate a reusable container storing a particular left-over item, such as the left-over chicken from yesterday's dinner, the user must manually search for the correct reusable container. Moreover, although some Universal Product Code and radio frequency identification systems permit users to track items in inventory, these systems do not permit users to track the transient contents of reusable containers.

As used herein, a storage unit is an appliance, room, or repository for storing and/or displaying items. A storage unit typically includes shelves or compartments to hold and/or organize items. A storage unit includes, but is not limited to, a refrigeration unit, a pantry, a storeroom, a cabinet, a set of shelves, a cupboard, a boxcar, a trailer, and/or any other compartment or container having space for storing and/or displaying items.

As used herein, a consumable item is any item that is depleted through use. Consumable items include, but are not limited to, food items, beverage items, soap, detergents, medicine, disposable paper products, and/or any other item that is depleted through use. Consumable items are generally consumed or depleted on a regular or semi-regular basis and then replaced and/or replenished by users in order to maintain a supply of these items in an inventory.

Therefore, the illustrative embodiments provide a computer implemented method, apparatus, and computer usable program product for mapping a content description to a reusable container. The process identifies a reusable container placed in a storage unit to form an identified container. The identified container includes an unidentified content. The process displays a set of predictive content descriptions for the unidentified content. In response to receiving a selection of a content description from the set of predictive content descriptions, the process maps the selected content description to the identified container.

The illustrative embodiments identify a reusable container having transient contents by mapping an identification tag associated with the container to a contents description. The process offers predictive content descriptions of the container based on an algorithm having variables such as the most recent item removed, the last meal selected, usage trends, and seasonal trends.

Current inventory is a record or listing of all the consumable items available in stock. Current inventory includes an identification of each item in stock and a measure/amount of each item in stock. Items in inventory are generally stored in storage units. As used herein, a storage unit is an appliance, room, or repository for storing and/or displaying items. A storage unit typically includes shelves or compartments to hold and/or organize items. A storage unit includes, but is not limited to, a refrigeration unit, a pantry, a storeroom, a cabinet, a set of shelves, a cupboard, a boxcar, a trailer, an oven and/or any other compartment or container having space for storing and/or displaying items.

As used herein, a consumable item is any item that is depleted through use. Consumable items include, but are not limited to, food items, beverage items, soap, detergents, medicine, disposable paper products, and/or any other item that is depleted through use. Consumable items are generally consumed or depleted on a regular or semi-regular basis and then replaced and/or replenished by users in order to maintain a supply of these items in an inventory.

The items present in an inventory can be identified using a Universal Product Code. A Universal Product Code (UPC) is a machine readable bar code coupled with a human-readable Universal Product Code number. The Universal Product Code includes a six-digit manufacturer identification number that provides information regarding a product, such as the manufacturer identification and product item number. A unique universal product code is not assigned to more than one product. Thus, a Universal Product Code scanner can read a Universal Product Code associated with a particular product to identify the product and/or determine a non-depletion quantity for the item. However, to maintain current inventories, each item in an inventory must be manually scanned with a bar code reader.

Radio frequency identification (RFID) can be used to identify, locate, and track items in an inventory. Radio frequency identification systems utilize radio frequency identification readers and radio frequency identification tags to identify objects associated with a radio frequency identification tag.

A radio frequency identification reader is a device that includes a transmitter and a receiver. Radio frequency identification tags, also referred to as transponders, identification tags, or smart tags, are small integrated circuits coupled with an antenna to transmit data. A radio frequency identification tag can be attached to or incorporated into an item package or into the item itself.

A radio frequency identification reader transmits an interrogate signal to radio frequency identification tags within an interrogate zone of the reader. Multiple radio frequency identification tags can reside within an interrogate zone of a radio frequency identification reader. In response to receiving an interrogate signal, radio frequency identification tags transmit a radio frequency response signal to the reader via an antenna associated with the tag. The response signal typically includes identification data, such as an identifier code. The reader receives the radio frequency response transmissions from the identification tags. The reader can identify a product based on the identifier code included in the response signal. The reader can also estimate an approximate location of the tag based on the strength and direction of the response signal.

Each radio frequency identification tag in the interrogate zone can be individually recognized by the radio frequency identification tag reader based on the identifier codes transmitted by each tag. Thus, a radio frequency identification tag reader can take an entire inventory of all items within an interrogate zone having a radio frequency identification tag without requiring intervention of a human user. However, radio frequency identification cannot be utilized to determine a meal plan based on the current amount of an item in inventory after the item has been opened/partially depleted by use.

FIG. 1 is a pictorial representation of a network of storage units in which the illustrative embodiments may be implemented in accordance with an illustrative embodiment. Storage unit 100 is a storage unit having an inventory of consumable items. Storage unit is connected to network 110. Network 110 is a medium used to provide communications links between various devices, databases, and storage units connected together, such as storage unit 100, remote storage unit(s) 160, and remote database 140. Network 110 may include connections, such as wire, wireless communication links, or fiber optic cables.

Storage unit 100 connects to network 110 along with one or more remote storage unit(s) 160. In addition, remote databases(s) 140 and remote controller(s) connect to network 110 via one or more servers, such as server 150. In the depicted example, server 150 provides data, such as boot files, operating system images, and applications to remote controller(s)

145 and remote storage unit(s) 160. Network 110 may include additional servers, clients, and other devices not shown.

Figure 2:
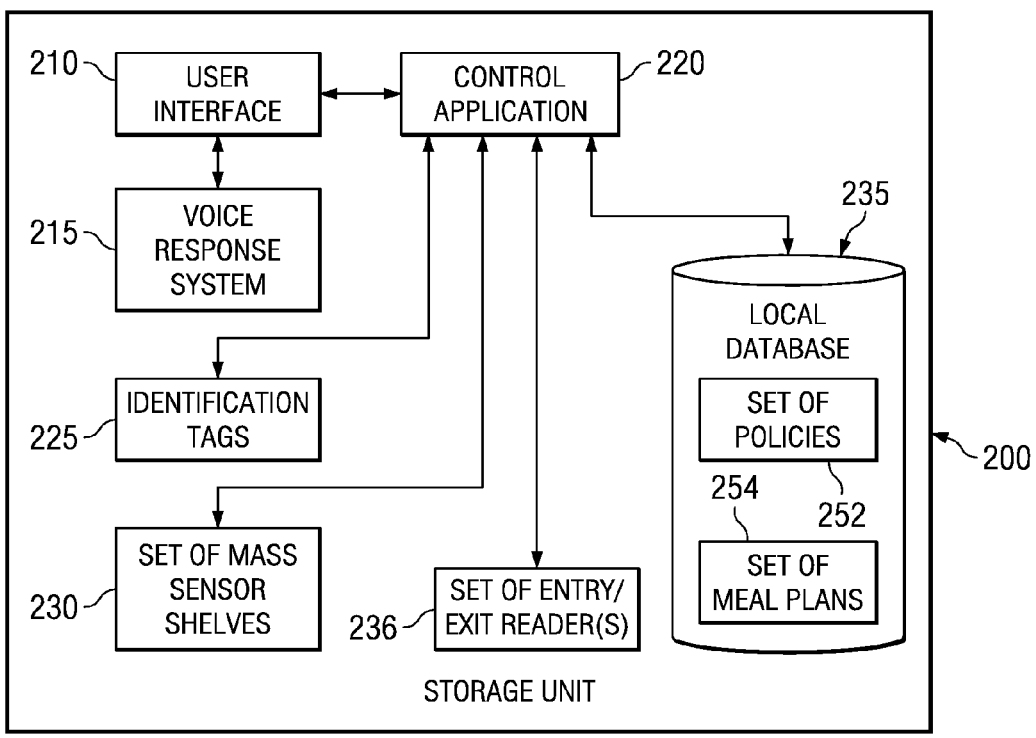
FIG. 2 is a pictorial representation of a storage unit in accordance with an illustrative embodiment.

FIG. 2 is a pictorial representation of a storage unit in accordance with an illustrative embodiment. Storage unit 200 is a storage unit, such as storage unit 100 and remote storage unit(s) 160 in FIG. 1.

User interface 210 provides a digital display for providing output to a user, as well as a keypad and/or touch screen for receiving input from a user. User interface 210 is associated with voice response system 215. Voice response system 215 includes a microphone, speaker, and voice synthesizer. Voice response system 215 permits users to provide verbal input to control application 220. Voice response system 215 also permits users to receive verbal output from control application 220, such as in providing text to speech operations.

Control application 220 is an application for receiving input and sending output to a user via user interface 210. Control application 220 identifies items associated with an identification tag placed in storage unit 200 to determine what ingredients are available in current inventory.

Items in inventory are identified via set of identification tags 225. Set of identification tags 225 is a set of one or more identification tags associated with one or more items in storage unit. Each identification tag has a unique item identifier code associated with the identification tag. In this illustrative example, set of identification tags 225 is a set of radio frequency identification tags associated with a set of consumable items inside storage unit 200.

Set of item identifier(s) 236 is a set of one or more item identifier(s). Item identifiers are used to identify an item as well as to determine an approximate location of an item and a precise location of an item. An approximate location of an item can be determined by a single item identifier. The item identifier receives a response signal from an identification tag. Control application 220 can determine an approximate location of the identification tag based on the strength and direction of the response signal. The item identifier generates approximate location coordinates for the approximate location of the identification tag. An item identifier in set of item identifier(s) 236 can be implemented by a radio frequency identification tag reader, a Universal Product Code scanner, or any other device for obtaining information from an identification tag. In an example in which the item identifier is a Universal Product Code scanner, a user scans each item at the Universal Product Code scanner. In an alternative example, a user can manually enter an identification code, item identifier, or other item description at a user interface rather than utilizing an item identifier.

Control application 220 determines the location of the item based on a mass footprint of the item generated when the item is placed on a given mass sensor shelf. The item's mass footprint is an impression of a portion of the item in contact with a mass sensor shelf. If two or more items are placed in the storage unit with a time interval occurring between placement of the items inside the storage unit, control application 220 associates a first change in mass data with the first item identified entering the storage unit. Control application 220 associates a second change in mass data with an item identified entering the storage unit second in time. Control application 220 utilizes the change in mass data to create a mass footprint and determine a current mass for the item identified immediately prior in time to the change in mass data.

If two or more items are identified entering the storage unit at the same time with no time interval in between the two items, control application 220 will associate a change in mass sensor data with the identified item having a corresponding mass footprint. For example, if a user places a jar of peanut butter and a carton of orange juice 200 at the same time, control application 200 will associated mass footprint data indicating a round mass footprint with the jar of peanut butter and associated mass footprint data indicating a square mass footprint with the carton of orange juice. Thus, control application 220 can distinguish items placed inside storage unit 200 simultaneously based on mass footprint data, such as the shape of the mass footprint.

If a user places two or more items in storage unit 200 at the same time that have similar mass footprint data, such as a jar of peanut butter and a jar of jelly, control application 220 will generate an error message and/or prompt a user to indicate a location and/or an identification of each item placed in the storage unit simultaneously.

Control application 220 can request an approximate location of the identification tag from an item identifier in set of item identifiers 236. In response, the item identifier generates approximate location coordinates for the approximate location of the identification tag based on the strength and direction of the response signal received by a given item identifier. The given item identifier than transmits this location to control application 220. In the alternative, the approximate location can be stored in local database 235.

Control application 220 can determine a precise location by triangulating a set of approximate coordinates generated by two or more item identifiers in set of item identifiers 236. The triangulated coordinates form a set of precise coordinates for the precise location of the identified item in storage unit 200. The precise location of the item can be stored in a database, such as local database 235 or remote database 140 in FIG. 1.

Control application 220 also determines a current amount of each identified item in storage unit 200 based on mass data for each identified item received from set of mass sensor shelves 230. Set of mass sensor shelves 230 is a set of one or more customized shelves having a mass sensor grid on an upper surface of the shelf. Each mass sensor associated with a mass sensor shelf is an independent sensor capable of measuring a mass of an object resting on the mass sensor. Each mass sensor transmits mass sensor measurements in the form of mass sensor data to control application 220.

Control application 220 stores mass footprint data, mass sensor data, item identification data, and meta information for each item stored in storage unit 200 in a local database 235 and/or remote database(s), such as remote database(s) 140 in FIG. 1. Local database 235 is any type of known or available data storage device. In this illustrative example, local database 235 is depicted as a database located on storage unit 200. However, local database 235 can also include any secondary data storage device and/or a remote data storage device, such as remote database 140 in FIG. 1. Local database 235 can be a single data storage device or multiple data storage devices. Local database 235 is a storage device for storing nutritional policies for a plurality of users and a plurality of updateable meal plans.

Mass sensor data for an identified item includes a current mass for an item, a prior mass for the item, an initial mass for the item, a depleted mass for the item, and a non-depleted mass for the item. A current mass is the most recent mass measurement for the item. The prior mass for the item is the previous mass for an item. The initial mass is the first mass measurement for the item when the item is identified by control application 220 for the first time. The depleted mass is the tare or mass of the item's empty container. In other words, the depleted mass is the mass of the item after the contents or product has been completely consumed and the empty item container is all that remains.

Thus, the net weight of the item is the depleted mass of the item subtracted from the gross weight of the item. The non-depleted mass is the net weight of the item. The non-depleted mass is a predetermined/predefined quantity of an item prior to use by a consumer. In other words, a non-depleted mass of a consumable item is the mass of the item at the time the item is purchased in an original unused condition. In an alternative embodiment, the non-depleted mass can be calculated by subtracting the item's tare weight from the item's initial or gross weight.

Control application 220 monitors mass sensor data and meta information for each item based on the mass sensor data, meta information, and item identification information stored in local database 235 and/or remote databases. Meta information includes details like timestamps associated with an item expiration data, a data and/or time when an item is first detected entering a storage unit, a time when an item is removed from a storage unit, a time interval between a time when an item is removed from a storage unit and the time when the item is returned to the storage unit, and any other time and/or data information relevant to an item freshness, perishability, and expiration information. Meta information is associated with each identified item stored in storage unit 200. Thus, control application 220 can provide a warning or alert when an item is past its expiration date and/or no longer fit for human consumption due to the age of the item.

Set of policies 252 is a set of policies corresponding to a set of users. When a user requests one or more meal plans, the user identifies two or more individual users. Control application 220 retrieves a nutritional policy for each identified user to form set of policies 252. Each nutritional policy in set of policies 252 includes a listing of nutritional requirements for the corresponding user as well as dietary restrictions. Control application 220 determines a set of potential meal plans conforming to a set of policies by comparing the nutritional requirements of each nutritional policy in the set of policies with the nutritional information corresponding to each meal plan.

Thus, in this illustrative example, control application activates set of item identifiers 236 when control application detects a door of storage unit 200 is opened. An item identifier transmits an interrogate signal. The item identifier identifies an item based on a response signal received from an identification tag associated with the item as the item enters storage unit 200 to form an identified item. The item identifier(s) also determine an approximate and/or exact location for the identified item based on the response signal.

Control application 220 requests mass sensor data associated with a location for the identified item. Control application 220 determines a current amount of the identified item by subtracting a current mass for the item from a non-depleted mass for the item. The item identification data and mass data are stored in database 235. In this manner, control application 220 maintains a current real-time inventory of all ingredients available and the amounts or quantity of each ingredient available in inventory. Control application 220 stores the current inventory, including the amounts of each item in inventory, in local database 236.

When a user requests one or more meal plans for a set of users, control application 220 retrieves a nutritional policy for each user in the set of users. Each nutritional policy is retrieved from set of policies 252 in local database 235. Each policy specifies nutritional requirements and/or prohibitions consistent with a particular diet policy. For example, a policy for a diabetic would prohibit food items containing certain levels of sugars. A nutritional policy can be loaded into a system as an extended markup language (XML) document that describes the nutritional needs of a particular individual.

Control application performs a search of set of meal plans 254 for meal plans conforming to a first policy in the set of policies 252 to form a first result set. Control application 220 performs a second search of set of meal plans 254 for meal plans conforming to the second policy in the set of policies 252 to form a second result set. Control application performs a search of set of meal plans 254 for conforming meal plans as to each policy in set of policies 252 until a result set has been generated for each policy in set of policies 252. As used herein, a conforming meal plan is a meal plan that satisfies all the nutritional requirements and prohibitions of a given nutritional policy.

In other words, control application 220 compares the nutritional requirements of a given nutritional policy in a set of policies with the nutritional information for each meal plan in the set of meal plans. Each meal plan conforming to a given nutritional policy is placed in a result set for that policy. Control application 220 continues this comparison process until a result set of conforming meal plans has been generated for each nutritional policy corresponding to a set of users. For example, result sets can be generated in accordance with the following exemplary algorithm involving three different nutritional policies:

Result Set 1=SELECT MealPlanName from MealPlanDatabaseTable where PolicyRequirementsofUser1 EQUAL NutritionofMealPlan Result Set 2=SELECT MealPlanName from MealPlanDatabaseTable where PolicyRequirementsofUser2 EQUAL NutritionofMealPlan Result Set 3=SELECT MealPlanName from MealPlanDatabaseTable where PolicyRequirementsofUser3 EQUAL NutritionofMealPlan Control application 620 selects meal plans that are included in the result set for every policy in set of policies. In other words, control application 620 generates a list of meal plans common to every result set for every nutritional policy in the set of nutritional policies. The meal plans that are common to all the result sets are identified to form a set of potential meal plans. For example, potential meal plans can be identified in accordance with the following exemplary algorithm:

SELECT MealRecipes from MealsDatabaseTable where MealName is the same between Resultset 1, 2, and 3.

In this manner, a set of potential meal plans conforming to the nutritional requirements of multiple nutritional policies can be generated.

In response to receiving a selection of a potential meal plan, control application 620 compares the listing of required ingredients for the selected meal plan and the required measurements for each ingredient with the current inventory. Control application 220 generates a listing of all required ingredients that are not currently available in inventory in an amount required by the selected meal plan. This listing of needed ingredients is displayed to the user.

In an alternative embodiment, the user can select to display all conforming meal plans that can be completely prepared from ingredients available in the current inventory. In this case, control application 220 compares the required ingredients for each potential meal plan with the current inventory. Control application 220 identifies potential meal plans that can be completely prepared from ingredients in current inventory to form set of suggested meal plans. The set of suggested meal plans are presented to the user for selection.

Control application 220 identifies an identification tag response signal as a reusable container identifier. Control application generates an alert to a user, such as a visual prompt through user interface 210, to request a content description to describe the new contents of the reusable container. Control application 220 generates a set of predictive content descriptions. The set of predictive content descriptions are possibilities as to what the transient contents of the reusable container may be. For example, if a user's last selected meal plan was for chicken and rice, the set of predictive content descriptions would include chicken and rice as a possible contents of a reusable container.

Control application 220 generates this set of predictive content descriptions based on an algorithm that uses as variables, the most recent items removed from the storage unit without being replaced, the last known meal selected by a user from a set of potential meal plans and/or a set of recommended meal plans, daily meal usage trends, and/or seasonal meal trends.

Control application 220 can generate predictive content descriptions based on a last known recipe or meal plan generated by control application 220 in response to a user request for a meal plan. An exemplary algorithm is as follows:

Predictive contents=Leftovers from LastMealPlan generated by mealplan algorithm.

Control application 220 can generate predictive content descriptions based on seasonal trends. For example, on or about Thanksgiving day, control application 220 can predict contents of reusable containers as potentially including turkey, dressing, pumpkin pie, cranberry sauce, and green bean casserole. An exemplary algorithm for a seasonal based predictive content description algorithm is as follows:

Predictive contents=
One of several potential seasonal dishes
IF (DateCheck)==Nov 23||24 THEN
(ShowThanksgivingList) AND
(populateThanksgivingVoiceGrammar)
ELSEIF (DateCheck)==Dec 24||25 THEN
(showChristmasList) AND (populateChristmasVoiceGrammar).

Control application 220 can also generate predictive contents based on usage trend selection. For example, some individuals prepare the same meals or food items on the same day of the week, such as fish on Friday. Another example of usage trends are cafeterias where the weekly menu is fixed. For example, Chicken and Broccoli on Monday, Bangers and Mash on Tuesday, Macaroni & Cheese on Wednesday.

In addition, individuals on a rigid diet frequently prepare the same or similar meals on consistent/predictable basis. For example, the meals eaten by diabetics on a glycemic index diet and athletes are not likely to vary much on a week to week basis due to the strict dietary requirements for these individuals. Control application 220 is able to predict the contents of reusable containers based on the meals that are frequently prepared by individual users on a weekly or monthly basis. In one embodiment, control application 220 can generate predictive content descriptions based on usage trends in accordance with the following exemplary algorithm:

Predictive contents=
Usage trend selection
IF (DayCheck)==Monday THEN
(PresentHistoricalMondaySelectionList)
ELSE IF (DayCheck)==Tuesday THEN
(PresentHistoricalTuesdaySelectionList).

These algorithms for generating predictive content descriptions can be implemented using any known or available programming language. In this embodiment, the algorithms are implemented using XHTML+Voice (X+V) language. XHTML+Voice enable speech recognition for input from a user and text to speech for output to the user.

In other words, the process can provide the set of predictive content descriptions to the user via a text to speech machine generated voice. In this case, the text to speech feature enables a user to listen to a list of predictive content descriptions as the user is placing the reusable container into the storage unit.

The user can verbally select a content description via voice response system 215. Voice response system 215 recognizes human speech as input through a speech recognition feature. Thus, in this embodiment, the process of identifying and locating a reusable container are performed through a voice interactive system that does not require a user to manually enter a content description or manually request a location of a reusable container through a keypad or display screen. This feature enables a hands-free interaction with the control application. Thus, a user is able to carry out other tasks such as placing items into a refrigerator or removing items from a refrigerator while mapping content descriptions to reusable containers.

In response to receiving a selection of predictive content description, control application 220 maps the selected content description to the identified reusable container. For example, at Thanksgiving, the user can choose a predictive content description "turkey." When the user wants to find the leftover turkey, the user can verbally or manually query control application 220 for a location of turkey. Control application 220 determines that "turkey" is mapped to an identifier tag for the given reusable container. Control application 220 provides the location of the given reusable container.

In accordance with another illustrative example, when the user removes the given reusable container identified as storing turkey, control application 220 unmaps the given reusable container from the content description "turkey." The next time control application 220 identifies the given reusable container, control application 220 again queries the user to select and/or enter a content description to describe the transient contents of the given reusable container. In other words, control application 220 assumes that the contents of a given reusable container will change each time the reusable container is removed from a refrigerator and then returned to the refrigerator.

In accordance with another illustrative embodiment, control application 220 determines if a predetermined period of time passed between the removal of the given reusable container and the replacement of the reusable container in the refrigerator. If the predetermined time period did pass, control application 220 assumes the contents of the given reusable container have changed. In this case, control application 220 will query the user to select/enter a new content description. However, if the predetermined time period does not pass, control application 220 will assume that the contents of the given reusable container have not changed. In this case, control application 220 will query the user as to whether the user wishes to change the content description for the given reusable container. If the user does not enter a new/different content description, control application 220 assumes the previous content description is still accurate. Control application 220 does not un-map the content description from the given reusable container in this example.

Control application 220 saves every content description and a date associated with every instance of mapping a content description to a given reusable container in a database, such as local database 235 and remote database 140 in FIG. 1. The content descriptions and dates associated with a given reusable container stored in the database forms a set of historical trends. The set of historical trends include seasonal and usage trends for content descriptions. Control application 220 utilizes the set of historical trends to generate predictive content descriptions based on usage and seasonal trends based on past content descriptions entered and/or selected by a user.

In another illustrative embodiment, a user may fail to scan an item at a location sensor and/or one or more location sensors may be absent, malfunctioning or otherwise unavailable or unable to detect/identify items entering storage unit and exiting storage unit 200. In such a case, control application 220 can determine when an item is placed inside storage unit 200 and/or removed from storage unit 200 based on mass footprint data for items. Control application 220 uses the detection of item footprints for previously identified items to detect an item entry into storage unit 200 and/or the item exit/removal from storage unit 200. For example, if a user removes a jar of peanut butter and a carton of milk, control application 220 detects the removal of these two items based on the removal of the detected mass footprint on a mass sensor shelf associated with these items. In other words, when the two items are removed, the mass sensor data registered by the mass sensor shelf changes. Control application 220 can determine that the jar of peanut butter and the carton of milk were removed based on the absence of the footprint for the carton of milk and the footprint for the jar of peanut butter.

In this example, the user consumes some product from the carton of milk and jar of peanut butter then places the peanut butter and milk back into storage unit 200 within a configurable time interval. Control application 220 knows that two previously identified items were removed and two items with the same footprint have been added to storage unit 200. Control application 220 can check to ensure that the mass of the two items has not increased above the previous mass for the two remove items. Control application then correlates the items placed on the mass sensor shelf by matching the footprint of the two added items to the previously removed items. If mass for one of the items has increased, the increase in mass could indicate replenishing or adding to the contents of the item container. In addition, an increase in mass for an item could indicate a different item with the same footprint. In this case, re-identification or re-scanning of the item is necessary. In one example in which re-identification is required, control application 220 will prompt user to enter an item identification for the item with the increased mass via a user interface or a voice response system. In this manner, control application 220 can identify/detect items that are not scanned and/or are not easily scanned on location sensors. An item could be difficult to scan if the item lacked radio frequency identification tags, the item identifier is a universal product code that must be manually scanned by a user, a user fails to scan an item, location sensors are malfunctioning, identification tags are malfunctioning, or location sensors and identification tags otherwise fail to provide an identification for the item.

Thus, the illustrative embodiments permit triggering event handling of items based on a change in mass footprint data. A change in mass footprint data includes the appearance and disappearance of an item. Event handling of items includes depletion monitoring of items.

In this illustrative example, control application 220 is depicted as a separate component from item identifiers. However, in accordance with the illustrative embodiments, control application 220 can be combined with one or more item identifiers as a single component.

Figure 3:
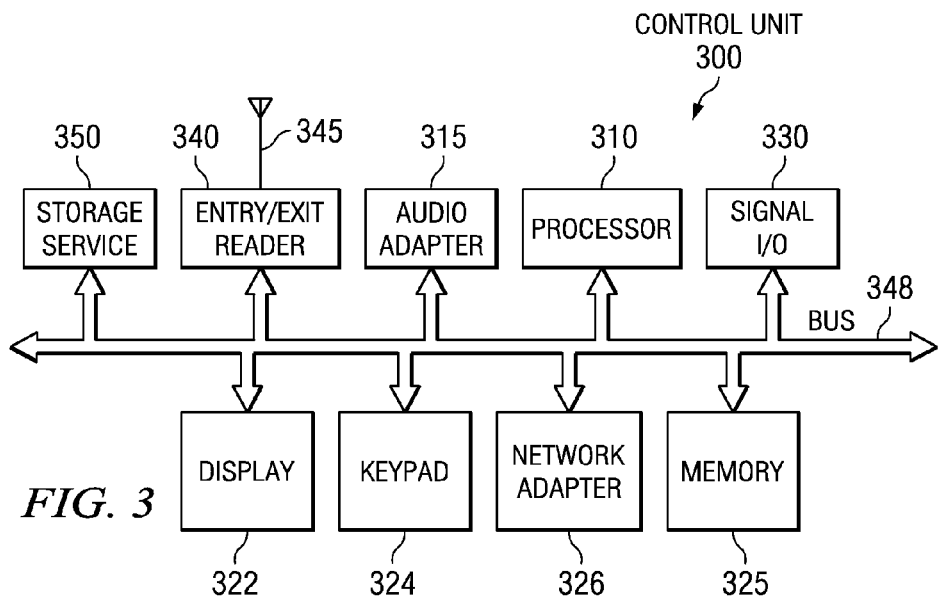
FIG. 3 is a block diagram of a control unit in accordance with an illustrative embodiment.

FIG. 3 is a block diagram of a control unit in accordance with an illustrative embodiment. A control unit is an application that monitors a current inventory, selects a set of potential meal plans based on a set of policies, and generates a list of needed ingredients not available in current inventory to prepare one or more selected meal plans. Control unit 300 is an example of hardware for implementing a control application, such as the control application 220 in FIG. 2.

Control unit 300 is hardware in which code or instructions implementing the processes of the illustrative embodiments may be located. Control unit 300 executes computer usable program code for controlling item identifiers, mass sensor shelves, and a user interface in accordance with the illustrative embodiments.

Processor 310, audio adapter 315, memory 325, display 322, keypad 324, network adapter 326, and signal input/output (I/O) 330 are connected via bus 348. Bus 348 may be comprised of one or more buses, such as a system bus and/or an I/O bus. Bus 348 may be implemented using any type of communications fabric or architecture that provides for a transfer of data between different components or devices attached to the fabric or architecture.

Processor 310 may include one or more processors or CPUs. Memory 325 may be a main memory, a read only memory (ROM), a random access memory (RAM), flash memory, a cache, or any other known or available memory for storing data, instructions, and/or computer usable program code. Controller 300 retrieves data, instructions, and/or code from memory, such as main memory or read only memory. In addition, controller 300 can retrieve data, instructions, and/or code from a remote memory location via a network connection.

Display 322 can include a touch screen display, an LED display, or any other type of known or available display for presenting output to a user or receiving input from a user. Keypad 324 is any type of known or available alphanumeric keypad for a user to provide input in the form of data, instructions, or program code to controller 300.

Network adapter 326 is coupled to the system to enable the data processing system to become coupled to other data processing systems or remote printers or storage devices through intervening private or public networks. Modems, cable modem and Ethernet cards are just a few of the currently available types of network adapters.

Signal input/output 330 includes one or more devices for sending and receiving signals to and from different components in a storage unit, such as a digital display and keypad, a touch screen, a voice recognition interface, an LED display, and/or any other known or available devices for sending and receiving input and output.

Item identifier 340 is an item identifier such as set of item identifier(s) 236 in FIG. 2. Controller 300 is coupled to item identifier 340 via bus 348. Controller 300 activates item identifier 340 to transmit an interrogate signal to identify any radio frequency identification tags within an interrogate zone of item identifier 340. As used herein, an interrogate zone is a zone or region in which an interrogate signal has sufficient strength to be received by a radio frequency identification tag within the interrogate zone and trigger the radio frequency identification tag to transmit a radio frequency in response to the interrogate signal.

Storage device 350 is also optionally connected to bus 348. Storage device 350 may include any type of permanent and removable storage media, such as database 235 in FIG. 2. In addition, storage device 350 can include a remote storage device or storage provided by a storage service. Program code and instructions are located on storage device 350 and may be loaded into memory 325 for execution by processor 310.

The processes of the illustrative embodiments are preformed by processor 310 using computer implemented instructions, which may be located in memory 325. Processor 310, memory 325, signal input/output 330, and storage device 350 are functional components that can be implemented as functions in an application specific integrated circuit rather than using a processor paradigm.

Figure 4:
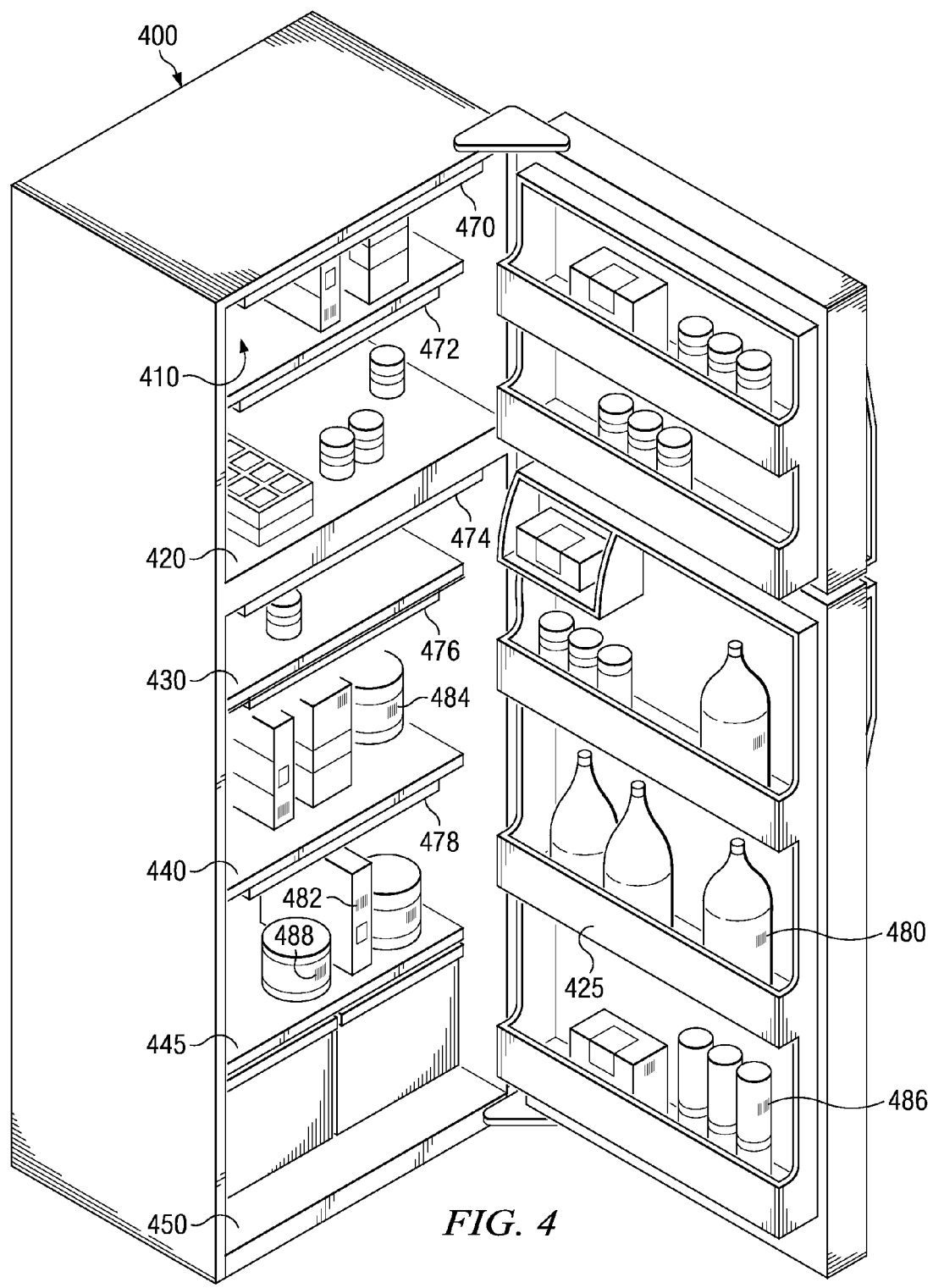
FIG. 4 is a block diagram of a refrigeration unit including a set of mass sensor shelves and item identifiers in accordance with an illustrative embodiment.

FIG. 4 is a block diagram of a refrigeration unit including a set of mass sensor shelves and item identifiers in accordance with an illustrative embodiment. As used herein, a refrigeration unit is any device, appliance, cabinet or room for storing food or any other substance at a lower temperature than room temperature. For example, a refrigeration unit includes a refrigerator, a freezer, a combination refrigerator and freezer, an ice box, a refrigerated railcar, a meat locker, an industrial refrigerator, an industrial freezer, a chest freezer, a reach-in cabinet, meat cases, frozen food cabinets, beverage coolers, food service carts, ice cream cabinets, soda fountain units, and any other known or available device or appliance for storing solid, semi-solid, or liquid items at a temperature lower than room temperature.

Refrigerator 400 is an example of a storage unit, such as storage unit 400 and remote storage unit(s) 120 in FIG. 1 and storage unit 200 in FIG. 2. Refrigerator 400 is any known or available type of refrigerator. In this illustrative example, refrigerator 400 is depicted as a consumer size refrigerator/freezer combination appliance. However, the illustrative embodiments are equally applicable to a refrigeration unit of any size, including, but not limited to, an apartment sized refrigerator/freezer, a room sized industrial refrigerator and/or a room-sized industrial freezer.

Refrigerator 400 includes a set of mass sensor shelves. As used here, a set of mass sensor shelves includes a single mass sensor shelf, as well as two or more mass sensor shelves. The set of mass sensor shelves includes mass sensor shelves 420-450. Each mass sensor shelf has a grid of mass sensors. Each mass sensor in the grid is capable of detecting a whole or partial mass of an object. The mass of an object is detected when an object is completely or partially resting on any portion of a mass sensor.

In accordance with the illustrative embodiments, a mass sensor shelf can be any surface having mass sensors that can hold or store an item. For example, mass sensor shelf 420 is a mass sensor shelf located in a freezer compartment of refrigerator 400. Mass sensor shelf 425 is a shelf in a door of the refrigerator. Mass sensor shelves 430-445 are mass sensor shelves located in a refrigerator compartment of refrigerator 400. Mass sensor shelf 450 is a mass sensor shelf located in the bottom of a drawer of refrigerator 400.

Refrigerator 400 includes a set of item identifiers, such as item identifiers 470-478. Item identifiers 470-478 are radio frequency identification readers. Item identifiers 470-478 identify an item entering or exiting refrigerator 400 based on information provided by an identification tag associated with the item.

Refrigerator 400 includes a variety of items stored within refrigerator 400. A number of the items have an identification tag associated with the item, such as identification tags 480-488. In accordance with this example, identification tags 480-488 are radio frequency identification tags. One or more of the items are reusable containers having transient contents identified by a content description mapped to the identification tag associated with the given reusable container.

In accordance with this illustrative embodiment, an item identifier is a separate component from a mass sensor shelf. However, in another embodiment, an item identifier is incorporated within the mass sensor shelf itself. In such a case, the mass sensor shelf is capable of transmitting an interrogate signal to radio frequency identification tags within an interrogate zone of the mass sensor shelf. The mass sensor shelf is also capable of receiving radio frequencies transmitted by radio frequency identification tags within a reception range of the mass sensor shelf.

Item identifiers 470-478 are automatically activated to scan for identification tags being placed inside and/or removed from a storage unit such as refrigerator 400, when a door to the storage unit is opened. In another example, item identifiers 470-478 are activated to scan for identification tags when a change in mass sensor data from a set of mass sensors occurs. In yet another alternative example, item identifiers 470-478 are activated on a periodic or cyclical basis to identify and locate items associated with identification tags 480-488.

In accordance with an alternative embodiment, identification tags, such as identification tags 480-488, are Universal Product Code bar codes and item identifiers, such as item identifiers 470-478, are Universal Product Code scanners. In this embodiment, a user manually scans identification tags, such as tag 480 at an item identifier, such as item identifier 478. Identification tag 480 is scanned by the user when the item is placed in the storage unit and/or removed from the storage unit. In this manner, the process of the illustrative embodiment can identify each item as the item is scanned for placement inside refrigerator 400. The process can determine a location for an item identified via a Universal Product Code by detecting a change in mass sensor data from a set of mass sensors after a given item is scanned. The process approximates the location of the set of mass sensors registering an increase in mass sensor data as the approximate location of the scanned item placed in refrigerator 400.

In another example, an item is identified based only on a mass footprint for the item. For example, a jar of peanut butter can be identified based on the fact that a jar of peanut butter was removed from storage unit 200, a time interval passed, and a newly detected item having the same mass footprint as the peanut butter is placed on a given mass sensor shelf. If a user places a jar of peanut butter and a carton of orange juice in refrigerator 400 at the same time, the control application will associated mass footprint data indicating a round mass footprint corresponding to a jar of peanut butter as a current mass and footprint for the peanut butter. The control application will associate mass data indicating a square mass footprint corresponding to a carton of orange juice as a current mass and footprint for the carton of orange juice. Thus, the control application can distinguish items placed refrigerator 400 simultaneously based only on mass footprint data, such as the shape of the mass footprint.

If a user places two or more items in refrigerator 400 at the same time that have similar mass footprint data, such as a jar of peanut butter and a jar of jelly, the control application will require re-identification of the items. The control application will generate an error message and/or prompt a user to indicate a location and/or an identification to re-identify each of the items that were placed in the storage unit simultaneously.

This illustrative embodiment in which an item is identified based on a mass footprint rather than scanning by an item identifier could be utilized in a system including, but not limited to, item identifiers that are Universal Product Code scanners that require manual scanning of each item and/or a user interface that requires a user to manually enter an item description/item identification for each item.

In another example, refrigerator 400 does not include a set of item identifiers. In this example, a user manually enters an item identification in a user interface prior to placing the item in refrigerator 400, as the user places the item in refrigerator 400, or after the user places in item in refrigerator 400. In this example, if a user does not enter an identification for an unidentified item, a user interface associated with refrigerator 400 will prompt the user to enter an item identification via the user interface.

Figure 5:
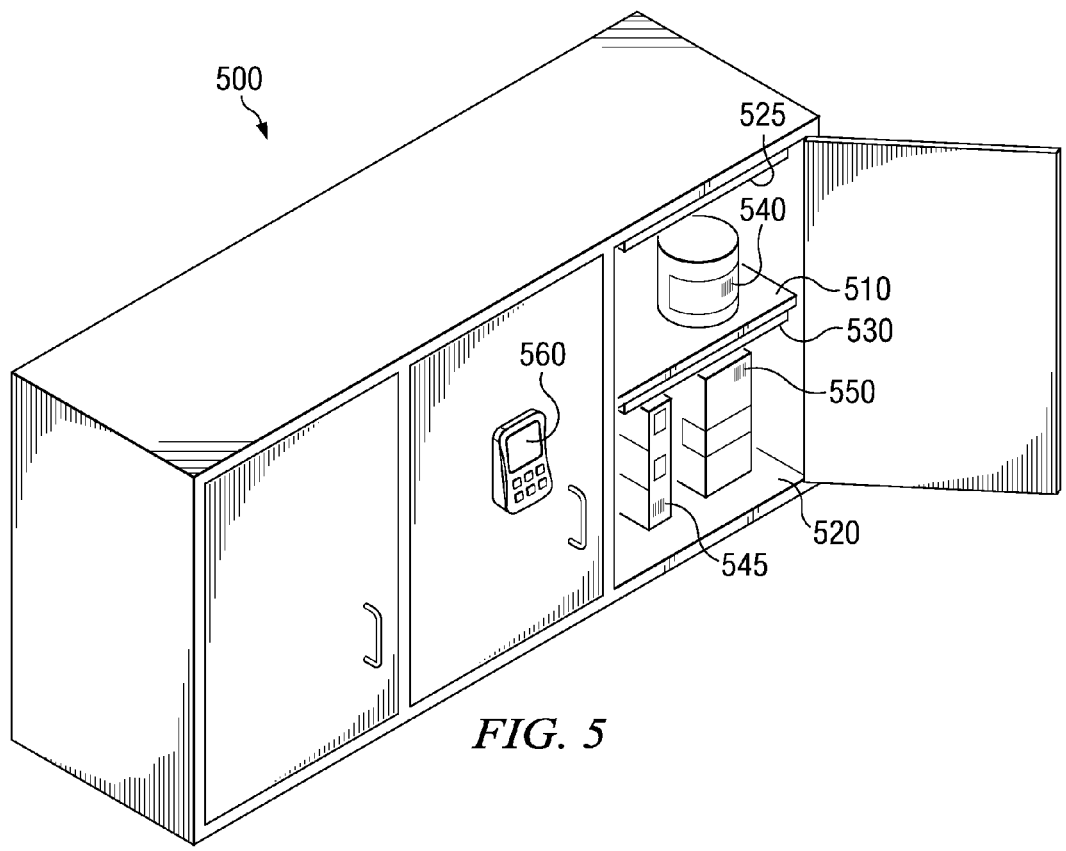
FIG. 5 is a block diagram of a cabinet including a set of mass sensor shelves and item identifiers in accordance with an illustrative embodiment.

FIG. 5 is a block diagram of a cabinet including a set of mass sensor shelves and item identifiers in accordance with an illustrative embodiment. Cabinet 500 is a storage unit, such as storage unit 100 and remote storage unit(s) 120 in FIG. 1 and storage unit 200 in FIG. 2.

Cabinet 500 includes a set of mass sensor shelves and a set of item identifiers. The set of mass sensor shelves includes mass sensor shelf 510 and mass sensor shelf 520. In this illustrative example, item identifiers 525-530 are radio frequency identification readers.

Each consumable item inside cabinet 500 has an identification tag, such as identification tags 540-550, associated with the item. In this example, item identifiers 525-530 are automatically activated to scan for items being placed inside cabinet 500 and items being removed from cabinet 500 when the cabinet door is opened.

User interface 560 is a digital display and keypad that provides output to a user and accepts input from the user. The digital display is any type of display for providing information to a user in the form of characters, numbers, symbols, or letters. The display can also include a touch screen for accepting input from a user. The keypad is an input device for data entry by a user. The keypad comprises alphanumeric keys and functional keys.

Figure 6:
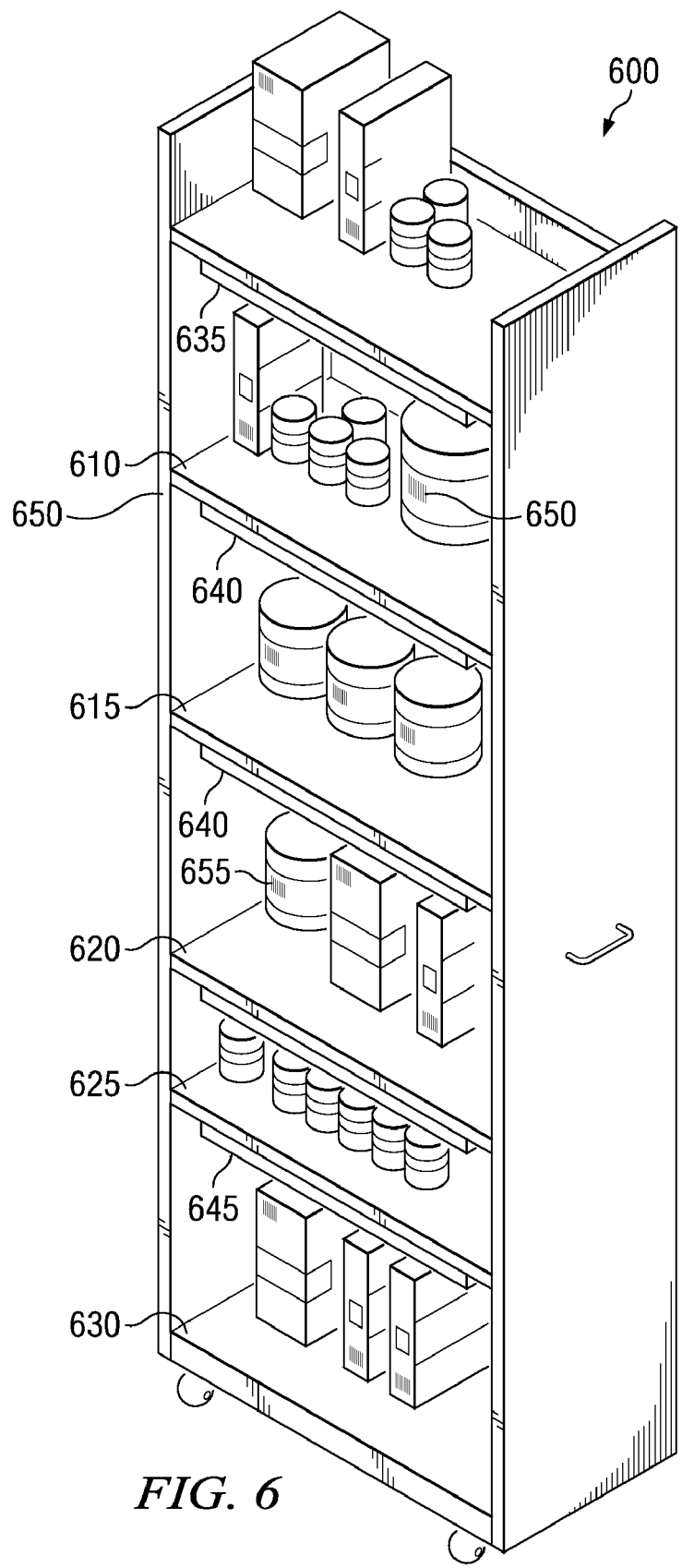
FIG. 6 is a block diagram of a set of shelves including mass sensor shelves and item identifiers in accordance with an illustrative embodiment.

FIG. 6 is a block diagram of a set of shelves including mass sensor shelves and item identifiers in accordance with an illustrative embodiment. Set of shelves 600 is a storage unit. Set of shelves 600 includes mass sensor shelf 610, mass sensor shelf 615, mass sensor shelf 620, mass sensor shelf 625, and mass sensor shelf 630.

Set of shelves 600 also includes item identifier 635, item identifier 640, and item identifier 645. In this example, item identifiers 625-630 are radio frequency identification readers. Item identifiers 635-645 are activated by the controller to transmit an interrogate signal to identification tags 650-655.

Those of ordinary skill in the art will appreciate that the storage units depicted in FIGS. 1-6 may vary. The depicted examples are not meant to imply architectural limitations with respect to an illustrative embodiment. For example, a storage unit in accordance with the illustrative embodiments could also include a pantry, a cupboard, a closet, a portable storage unit, or an oven. As used herein, an oven is a chamber or enclosed compartment for sterilizing, heating, warming, or cooking. An oven includes, but is not limited to, a stove, a kiln, a green house, a heated rail car, and/or a microwave oven.

Figure 7A:
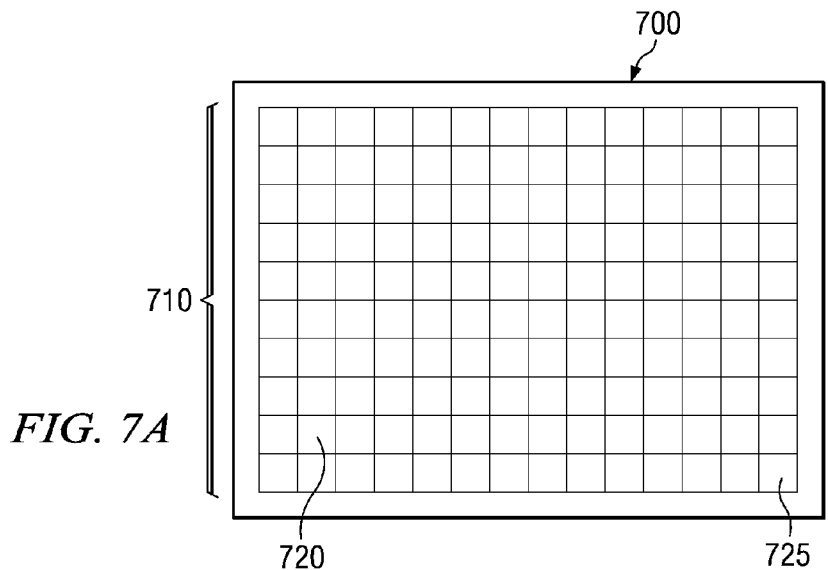
FIG. 7A is a block diagram of a mass sensor shelf having a mass sensor grid in accordance with an illustrative embodiment.

FIG. 7A is a block diagram of a mass sensor shelf having a mass sensor grid in accordance with an illustrative embodiment. Mass sensor shelf 700 is a mass sensor shelf inside a storage unit, such as refrigerator 400 in FIG. 4, cabinet 500 in FIG. 5, and set of shelves 600 in FIG. 6. Mass sensor shelf 700 has a mass sensor grid 710 spanning the entire area of an upper surface of mass sensor shelf 700. Mass sensor grid includes a plurality of mass sensors, such as mass sensor 720 and mass sensor 725.

Each block in mass sensor grid 710 represents an individual mass sensor in the plurality of mass sensors. Each sensor is separate and isolated from every other sensor in the mass sensor grid. In this illustrative example, mass sensors 720-725, are tiny mass sensors measuring one centimeter by one centimeter. In accordance with the illustrative embodiments, mass sensors can be any shape and any size mass sensors. For example, mass sensors 720-725 can measure one centimeter by two centimeters, or any other size.

Mass sensors in mass sensor grid 710 can measure a mass of an item wholly or partially placed on top of a given mass sensor. Thus, when an object is placed on a mass sensor shelf, each mass sensor covered by the object will generate mass data regarding a portion of the object. The process utilizes mass data from the set of mass sensors covered by an object on a mass sensor shelf to determine a mass of the object.

Figure 7B:
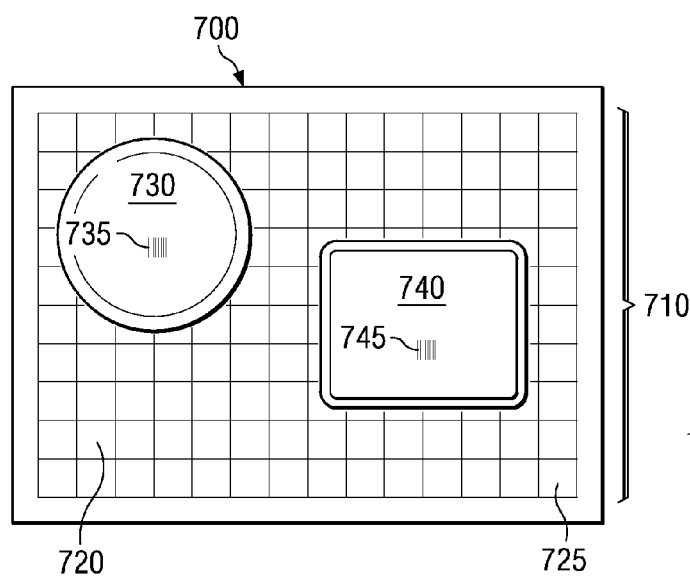
FIG. 7B is a block diagram of a mass sensor shelf having a mass sensor grid and consumable items on the shelf in accordance with an illustrative embodiment.

FIG. 7B is a block diagram of a mass sensor shelf having a mass sensor grid and consumable items on the shelf in accordance with an illustrative embodiment. Jar of peanut butter unit 730 is located on mass sensor shelf 700. Unit 730 rests on a set of mass sensors of mass sensor grid 710. The set of mass sensors generates mass data regarding the mass of unit 730.

Unit 730 is a self-describing item having fixed contents. Unit 730 is associated with identifier tag 735. Identifier tag 735 is a bundled radio frequency identification passive tag that is read by an item identifier to identify unit 730 as a jar of peanut butter.

In this example, a reusable Tupperware® container with a content description "tuna salad" is also located on mass sensor shelf 700. The Tupperware of tuna salad unit 740 is associated with identifier tag 745. Identifier tag 745 identifies unit 740 as a reusable Tupperware® container. Each time the process identifies unit 740 entering a mass sensor shelf, such as mass sensor shelf 700, the process queries the user to select a content description from a set of predictive content descriptions or manually enter a new/different content description not included in the set of predictive descriptions. In this case, the user selected a content description "tuna salad." The process mapped the content description "tuna salad" to the given reusable Tupperware® container unit 740. Thus, when an item identifier receives identification data from identifier tag 745 to identify unit 740, the item identifier identifies unit 740 as a reusable Tupperware having contents described as "tuna salad." However, when unit 740 is removed from mass sensor shelf 700 for a time period greater than a predetermined time period, the process will unmap the content description "tuna salad" from unit 740. In this case, the next time the process identifies unit 740 entering any mass sensor shelf, the process will again prompt the user to enter or select a content description to describe the transient contents of unit 740.

A set of mass sensors covered by unit 740 generate mass data regarding the mass of unit 740. Thus, when an object is placed on a mass sensor shelf, the object will rest on a set of mass sensors on the portion of the shelf covered by the object. Each mass sensor in the set of mass sensors transmits mass data regarding the mass of the object to a control application, such as control application 220 in FIG. 2.

The control application creates a mass footprint for the identified item. The mass footprint is an impression of a shape of a portion of the identified item in contact with a portion of the mass sensor shelf. The portion of the mass sensor shelf in contact with the identified item is the set of mass sensors transmitting mass data regarding the mass of the identified item. In this example, unit 730 has a mass footprint indicating a current mass of unit 730 and a shape of a surface of unit 730 in contact with mass sensor shelf 700. The shape indicated by the mass footprint is round. In this example, either the top or bottom of a jar of peanut butter is in contact with a portion of mass sensor shelf 700.

Likewise, the mass footprint for unit 740 indicates a current mass of unit 740 as well as a shape of a surface of unit 740 in contact with a portion of mass sensor shelf 700. In this example, unit 740 has a square shaped mass footprint, as a surface of the Tupperware of tuna salad in contact with mass sensor shelf 700 is square. In this case, the surface of the Tupperware of tuna salad in contact with a portion of mass sensor shelf could include a top, a bottom, or a side of a square Tupperware container.

In the illustrative embodiment shown in FIGS. 7A and 7B, the mass sensor shelf includes a grid array containing a mass sensor for each portion of the grid. The grid array determines a current mass for an item in contact with the grid array, as well as a mass footprint or impression of the portion of the item in contact with the grid array.

However, in another exemplary embodiment, the grid array includes a single mass sensor, rather than a plurality of mass sensors in a grid. In this example, the grid array is used only in the calculation of the mass footprint or impression of the item in contact with the shelf to create a footprint for the item. The mass of the item is determined by subtracting a previous mass for the entire shelf, including all items on the shelf, from a current mass for the entire shelf, also including all items on the shelf.

Thus, mass change is identified by placing an item on the given shelf and measuring the resultant change in total mass of the shelf. The control application correlates the change in mass with the resultant change in mass footprint data. The change in mass footprint data is due to the additional mass of the item added to the given mass sensor shelf. The change in mass is associated with a newly detected mass footprint for the item. The newly detected mass footprint and the change in mass for the entire shelf are associated with the item placed on the given mass sensor shelf when the change in mass and mass footprint data are detected.

Figure 8:
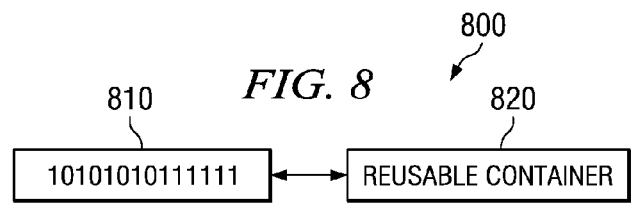
FIG. 8 is a block diagram illustrating an association of an identifier code from an identifier tag with a consumable item description in accordance with an illustrative embodiment.

FIG. 8 is a block diagram illustrating an association of an identifier code from an identification tag with a consumable item description in accordance with an illustrative embodiment. Data structure 800 is an example of data stored in a database, such as local database 235 in FIG. 2 and remote database 140 in FIG. 1. The description pair includes a machine readable identifier code, such as "10101010111111" associated with identification tag 810. The pair also includes a human readable item description 820 that is associated with identifier code "10101010111111" associated with identification tag 810. Other examples of identifier codes include, for example, "1234564", "A", or any other code that is unique among all identifier codes that a tag reader can read. An item description is a human understandable description of an item. Human understandable descriptions are for example, text, audio, graphic, or other representations suited for display or audible output.

In this illustrative example, identification tag 810 having code "10101010111111" is associated with item description "reusable container" 820. When the process of the illustrative embodiments receives an identifier tag describing an item as a reusable container, the process prompts a user to enter a content description for the contents of the item described as a reusable container. The selected content description is mapped to the identifier code for the identification tag associated with the given reusable container.

A user interface and tag reader operates cooperatively with identification tags to identify items for placement in a storage unit and/or identify items already placed inside a storage unit. Identification tags, such as identification tag 810 can be any type of identification tag, including Universal Product Code (UPC) bar code identification tags and radio frequency identification (RFID) tags.

Radio frequency identification tags include read-only identification tags and read-write identification tags. A read-only identification tag is a tag that generates a signal in response to receiving an interrogate signal from an item identifier. A read-only identification tag does not have a memory. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identifier codes.

FIG. 9 is a block diagram illustrating an interaction of a user interface and tag reader with an identification tag in accordance with an illustrative embodiment. Control unit 900 is a control unit such as control unit 200 in FIG. 2. Control unit 900 includes a user interface and item identifier(s). Control unit 900 activates an item identifier associated with a storage unit to generate an interrogate signal 910 to form an interrogation zone. Item 920 is located within the interrogation zone of the item identifier. Identification tag 930 associated with item 920 receives interrogate signal 910. In response to receiving interrogate signal 910, identification tag 930 generates response signal 940 via an antenna on the identification tag.

Control unit 900 receives response signal 940. Control unit 900 analyzes response signal 940 to identify an identifier code for item 920. Control unit 900 identifies item 920 by identifying an item description, such as item description 820 in FIG. 8, in identifier database 950 associated with the identifier code for identification tag 930.

FIG. 10 is a block diagram illustrating a container having unidentified contents in accordance with an illustrative embodiment. Reusable container 1010 and reusable container 1020 are examples of reusable containers having transient contents. Reusable container 1010 is associated with reusable container identifier tag 1030. Reusable container 1020 is associated with reusable container identifier tag 1040. Reusable container identifier tags 1030 and 1040 are identification tags, such as identification tags in set of identification tags 225 in FIG. 2. Reusable container identifier tags are any type of identification token that can be identified with an identification sensor, such as an item identifier in set of item identifiers 236 in FIG. 2. For example, reusable container identifier tags 1030 and 1040 can be Universal Product Code identification tags and/or radio frequency identification tags.

When an item identifier identifies an identification tag as a reusable container identifier tag, such as identifier tag 1030, the control application generates a set of predictive content descriptions for the unidentified content of the reusable container associated with the identifier tag. The control application prompts a user to select a content description from the set of predictive content descriptions. In response to a user selecting one of the predictive content descriptions, the control application maps the selected content description to the container, such as container 1010 associated with identifier tag 1030.

Figure 11:
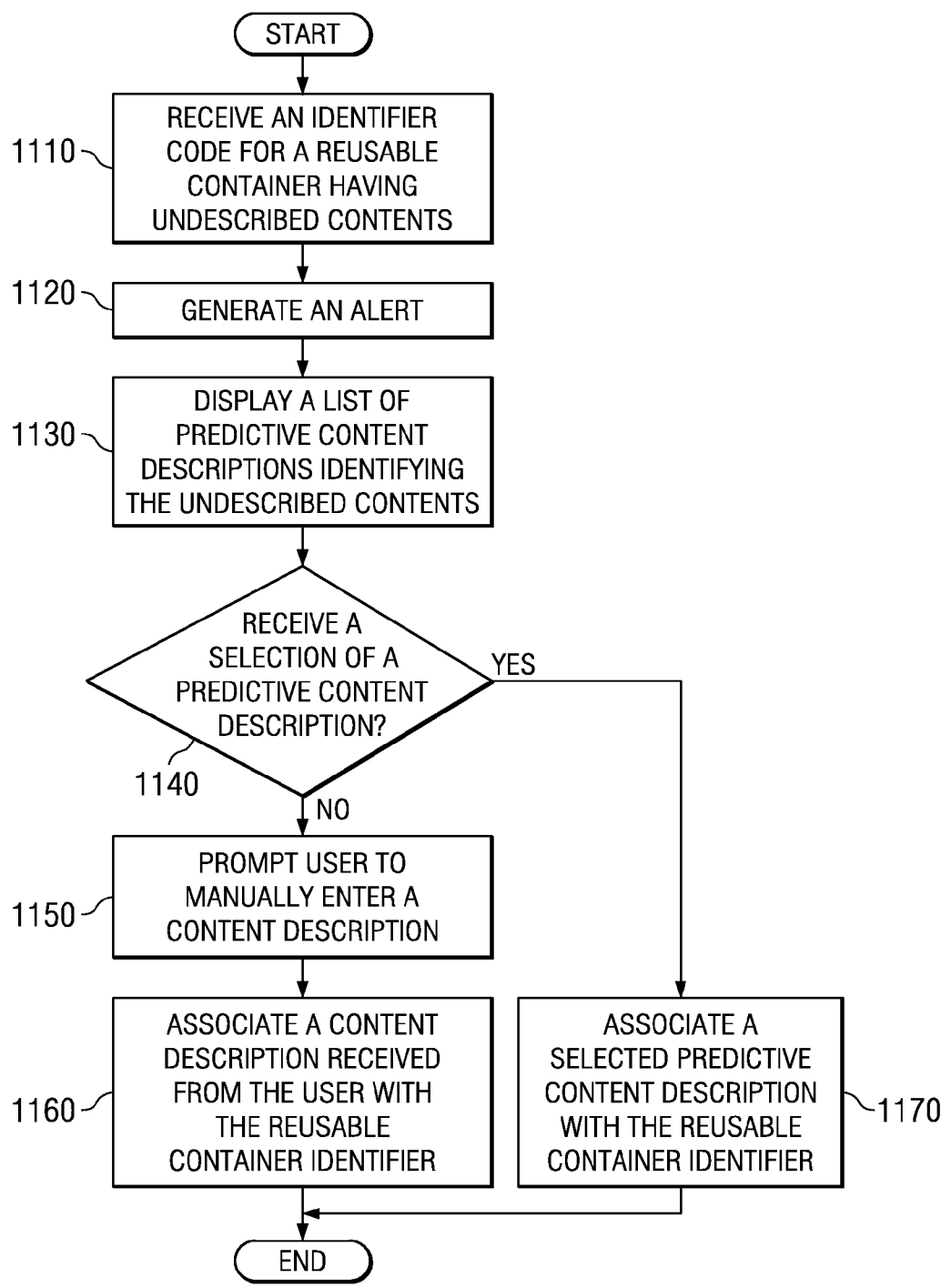
FIG. 11 is a flowchart illustrating a process for mapping a content description to a container in accordance with an illustrative embodiment.

FIG. 11 is a flowchart illustrating a process for mapping a content description to a container in accordance with an illustrative embodiment. The process is implemented by item identifier(s) and a control application, such as set of item identifier(s) 236 and control application 220 in FIG. 2.

An item identifier receives an identifier code for a reusable container having un-described contents (step 1110). The control application generates an alert (step 1120) prompting a user to select or enter a content description for the contents of the container. The control application displays a list of predictive content descriptions to identify the un-described contents (step 1130) based on various factors. These factors include daily meal trends, seasonal meal trends, a last recommended meal plan, a last recommended set of potential meal plans and/or a set of items removed from a storage unit within a predefined preceding period of time.

The control application determines if a selection of a predictive content description is received from a user (step 1040) within a predefined period of time. If the control application determines that a selection of a predictive content description is not received, the control application prompts the user to manually enter a content description (step 1150). The control application associates the content description received from the user with the reusable container identifier (step 1060) with the process terminating thereafter.

Returning to step 1040, if the control application determines that a selection of a predictive content description is received from a user, the control application associates the selected predictive content description with the reusable container identifier (step 1170) with the process terminating thereafter.

A content description is associated with a given reusable container identifier by mapping the reusable container identifier with the content description. When a user wishes to retrieve the contents of the given container storing the contents described by the content description, the control application retrieves the reusable container identifier associated with the content description. The control application then locates the container associated with the reusable container identifier. The control application can determine a location for the container by retrieving a location in a database for the reusable container with the identifier tag that transmits the given reusable container identifier.

In an alternative embodiment, the control application can activate a set of item identifiers to transmit an interrogate signal to locate the identification tag transmitting the reusable container identifier that is mapped to the desired content description.

FIG. 12 is a flowchart illustrating a process for providing a location of a container mapped to a given content description in accordance with an illustrative embodiment. The process is implemented by an application, such as control application 220 in FIG. 2.

The process receives a location query asking for the location of a contents described by a user (step 1210). The process retrieves a container identifier mapped to the described content (step 1220). The process determines a location of a reusable container associated with the reusable container identifier based on a container identifier tag (step 1230). In other words, the process finds a location of the reusable container that has the identifier tag transmitting the correct reusable container identifier that is mapped to the desired content description. The process generates an alert to a user that includes the location of the reusable container that is storing the desired described content (step 1240) with the process terminating thereafter.

In another embodiment, when a user removes the container from the storage unit that contains the desired described content, the process will unmap the described content from the reusable container identifier for that identifier. In this case, when the user returns the reusable container to the storage unit, the process will again prompt the user to enter a described content for the reusable container. In this way, each time a given reusable container is removed from a storage unit and then returned to the storage unit, the process will assume that the contents of the given reusable container have changed.

The illustrative embodiments provide a computer implemented method, apparatus, and computer usable program product for generating meal plans based on a set of nutritional polices. The process permits a user to identify and monitor leftovers. When a refrigerator or other storage unit is overfilled and/or congested with multiple items, a particular reusable container storing a desired set of leftovers can be located by querying a control application for the location of the described contents. This prevents waste of food items stored in reusable containers that might otherwise be forgotten or lost until after the reusable container contents have spoiled.

The process identifies a container placed in a storage unit to form an identified container. The identified container includes an unidentified content. The process displays a set of predictive content descriptions for the unidentified content. In response to receiving a selection of a content description from the set of predictive content descriptions, the process maps the selected content description to the identified container.

The illustrative embodiments identify a container having transient contents by mapping an identification tag associated with the container to a contents description. The process offers predictive content descriptions of the container based on an algorithm having variables such as the most recent item removed, the last meal selected, usage trends, and seasonal trends.

By providing a list of predictive content descriptions, a user is able to enter a content description for a reusable container more quickly than if a user were required to manually type in a content description. In addition, leftovers can be identified by a content description describing the content, such as "mashed potatoes" or "Curry" rather than requiring a user to remember which reusable container a particular item is stored in. This feature saves users time and effort in identifying and locating transient contents stored in reusable containers.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for mapping a content description to a container, the computer implemented method comprising:
    using a computer having a processor connected to a memory, a user interface, and a mass sensor shelf, storing instructions in the memory adapted to cause the processor to perform steps comprising:
        identifying the container using an identifier code, wherein the container is placed in a storage unit to form an identified container, wherein the identified container includes an unidentified content;
        responsive to receiving the identifier code for the identified container, generating an alert;
        displaying a plurality of predictive content descriptions for the unidentified content on the user interface, wherein the plurality of predictive content descriptions is generated based on either a daily meal trend, a seasonal meal trend, a last recommended meal plan, a last recommended set of potential meal plans, or a set of items removed from the storage unit within a predefined preceding period of time;
        selecting a predictive content description from the plurality of predictive content descriptions;
        responsive to receiving the predictive content description from the plurality of predictive content descriptions, associating the predictive content description with the identifier code, and mapping the predictive content description to the identified container;
        responsive to mapping the predictive content description to the identified container, calculating a current mass using the mass sensor shelf and associating the identified container with the current mass; and
        responsive to calculating the current mass, determining a depletion of the identified container based on the current mass and a non-depleted mass for the identified container.

2. The computer implemented method of claim 1 wherein the storage unit is selected from a group consisting of a refrigeration unit, a pantry, a cupboard, a set of shelves, and a cabinet.

3. The computer implemented method of claim 1 further comprising:
    responsive to failing to receive the predictive content description from the plurality of predictive content descriptions, prompting a user to manually enter a content description.

4. The computer implemented method of claim 3 wherein entering the content description comprises:
    verbally entering the content description.

5. The computer implemented method of claim 1 wherein an identifier tag is associated with the identified container, and wherein the identifier tag is a radio frequency identification tag.

6. The computer implemented method of claim 1 wherein the plurality of predictive content descriptions is generated based on a consumed inventory for a predetermined time period prior to generating the plurality of predictive content descriptions.

7. The computer implemented method of claim 6 further comprising:
    responsive to receiving a location query regarding a location of the predictive content description, determining the location of the identified container corresponding to the predictive content description, wherein the identified container is mapped to the predictive content description.

8. The computer implemented method of claim 1 further comprising:
    generating an alert, wherein the alert includes the location of the identified container in the storage unit.

9. The computer implemented method of claim 1 further comprising:
    responsive to detecting a removal of the identified container from the storage unit, un-mapping the predictive content description from the identified container.

10. An apparatus for mapping a content description to a container, the apparatus comprising:
    a user interface;
    a tag reader; and
    a controller, wherein the controller further comprises:
        a bus;
        a storage device connected to the bus, wherein the storage device contains a computer usable program product, and wherein the computer usable program product contains a plurality of instructions; and
        a processor unit connected to the bus, wherein the plurality of instructions causes the processor unit to perform steps comprising:
            identifying the container using an identifier code, wherein the container is placed in a storage unit to form an identified container, wherein the identified container includes an unidentified content;
            responsive to receiving the identifier code for the identified container, generating an alert;
            displaying the plurality of predictive content descriptions for the unidentified content on the user interface, wherein the plurality of predictive content descriptions is generated based on either a daily meal trend, a seasonal meal trend, a last recommended meal plan, a last recommended set of potential meal plans, or a set of items removed from the storage unit within a predefined preceding period of time;
            selecting a predictive content description from the plurality of predictive content descriptions;
            responsive to receiving the predictive content description from the plurality of content descriptions, associating the predictive content description with the identifier code, and mapping the predictive content description to the identified container;

responsive to mapping the predictive content description to the identified container; calculating a current mass using a mass sensor shelf and associate the identified container with the current mass; and responsive to calculating the current mass, determining a depletion of the identified container based on the current mass and a non-depleted mass for the identified container.

11. The apparatus of claim 10 wherein the storage unit is selected from a group consisting of a refrigeration unit, a pantry, a cupboard, a set of shelves, and a cabinet.

12. The apparatus of claim 10 further comprising:

responsive to receiving a location query regarding a location of the predictive content description, determining the location of the identified container corresponding to the predictive content description.

13. A computer program product comprising:

a computer usable medium having a computer usable program code for mapping a content description to a container, the computer usable program code causing a computer to perform steps comprising:

identifying the container using an identifier code, wherein the container is placed in a storage unit to form an identified container, wherein the identified container includes an unidentified content;

responsive to receiving the identifier code for the identified container, generating an alert;

displaying a plurality of predictive content descriptions for the unidentified content on a user interface, wherein the plurality of predictive content descriptions is generated, based on either a daily meal trend, a seasonal meal trend, a last recommended meal plan, a last recommended set of potential meal plans, or a set of items removed from the storage unit within a predefined preceding period of time;

selecting one of the predictive content description from the plurality of predictive content descriptions;

the predictive content description from the plurality of predictive content descriptions, associating the predictive content description with the identifier code and mapping the predictive content description to the identified container;

responsive to mapping the predictive content description to the identified container, calculating the current mass using the mass sensor shelf and associating the identified container with the current mass; and responsive to calculating the current mass, determining the depletion of the identified container based on the current mass and the non-depleted mass for the identified container.

14. The computer program product of claim 13 wherein the storage unit is selected from a group consisting of a refrigeration unit, a pantry, a cupboard, a set of shelves, and a cabinet.

15. The computer implemented method of claim 1 further comprising:

generating a plurality of meal plans based on a nutritional policy;

selecting a meal plan from the plurality of meal plans;

responsive to receiving the meal plan, comparing a list of required ingredients for the meal plan and an amount for each of the required ingredients with a plurality of identified containers; and generating a new list of required ingredients that are not provided in the plurality of identified containers in the amount required by the meal plan.

* * * * *